March 6, 1951 J. HYDE 2,544,163
COMBINATION WAGON AND SLED
Filed Nov. 5, 1949
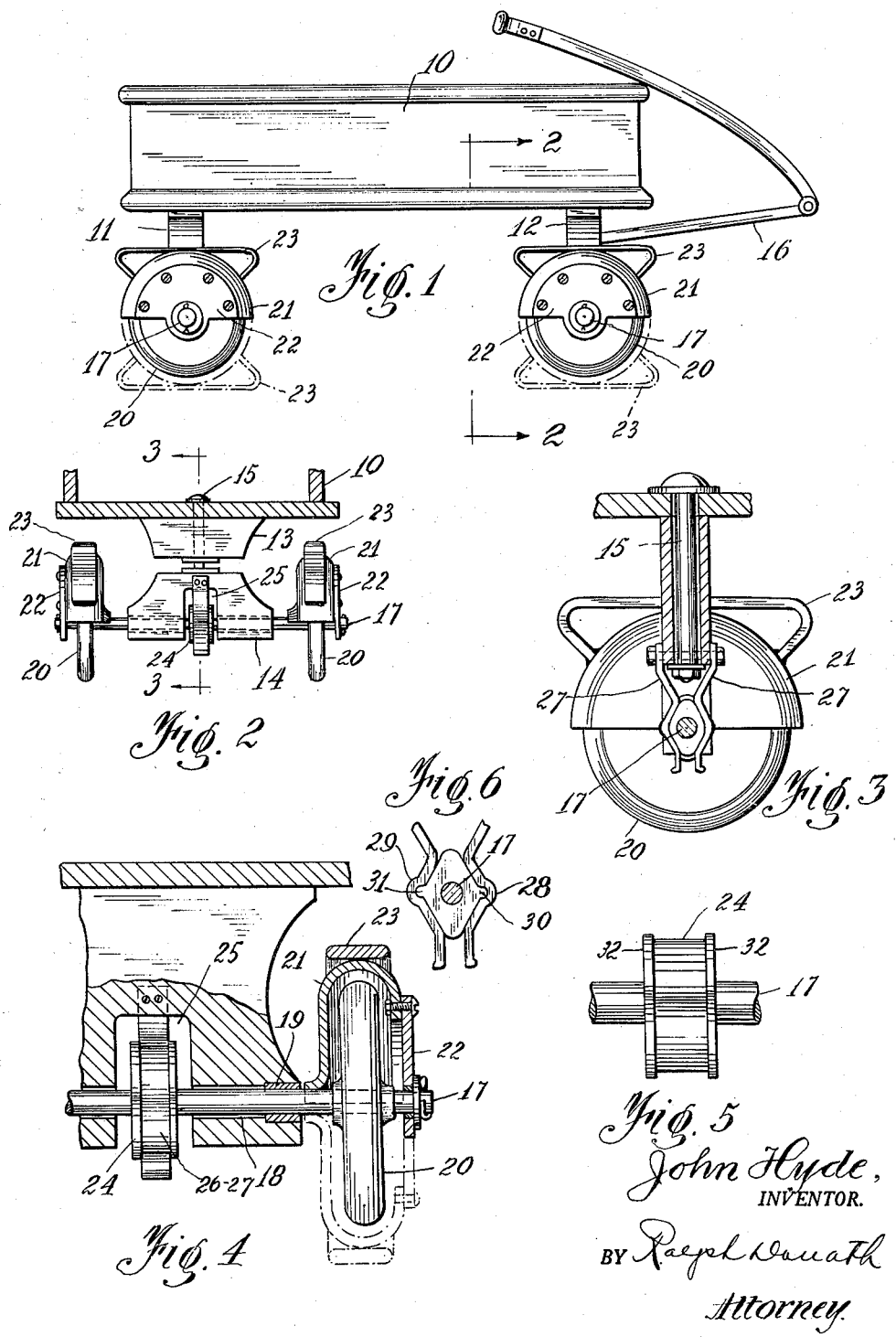
John Hyde, INVENTOR.
BY Ralph Donath
Attorney.

Patented Mar. 6, 1951

2,544,163

UNITED STATES PATENT OFFICE 2,544,163

COMBINATION WAGON AND SLED

John Hyde, Pittsburgh, Pa.

Application November 5, 1949, Serial No. 125,760

3 Claims. (Cl. 280—10)

This invention relates to a vehicle structure and more particularly to a child's sled and wagon combination in which both wheels and sled runners are present and readily interchangeable one for the other.

At the present time both wagons alone and sleds alone are known and used depending upon the climatic conditions. There are however many areas of the country and of the world where the weather conditions are such that a vehicle having quickly interchangeable wheels and runners would be extremely useful and desirable. Such combination vehicles as have heretofore been proposed are extremely cumbersome and involve such difficulties in shifting from wheels to runners or vice versa that they have not proven successful.

This invention provides such a combination vehicle which is not at all cumbersome, is simple in structure and so simple in operation that a child can readily operate it. In general this invention comprises in combination an axle adapted to be mounted for rotation on a vehicle gear, wheels rotatably mounted on said axle, a cover fixedly mounted on the axle over each wheel, runner means on the cover, cam means fixed on the axle and cam retainer means adapted to be mounted on a vehicle gear to hold the axle against rotation whereby with the cam in one position the cover is held out of contact with a surface over which the vehicle is to be moved and with the cam rotated substantially 180 degrees from said one position the cover is held so that the runner is in contact with the surface over which the vehicle is to be moved.

A more complete understanding of this invention may be had by referring to the accompanying drawings in which:

Figure 1 is a side elevation of a wagon having the combination of this invention.

Figure 2 is a section on the line 2—2 of Figure 1.

Figure 3 is a section on the line 3—3 of Figure 2.

Figure 4 is a partial section through the rear running gear of the wagon of Figure 1.

Figure 5 is a partial elevation of a cam according to this invention.

Figure 6 is a partial side elevation of another embodiment of the invention.

Referring first to Figure 1 there is illustrated a vehicle having a wagon box 10 mounted on a rear support member 11 and front support member 12. The front support member 12 is made up of an upper portion 13 and a lower portion 14 connected by a king bolt 15 in the usual manner. A tongue structure 16 is connected to the lower portion 14 for guiding and pulling the wagon.

An axle 17 is mounted for rotation in a passage 18 through each of the support members 11 and 12. A bearing 19 may be inserted in each end of the passage 18 to prevent wear in the passage 18 and to hold the axle stable. A wheel 20 is rotatably mounted on each end of the axles 17 and held in position by a washer and cutter pin or other usual means. A cover 21 surrounding the upper half of each wheel is fixedly mounted on each end of the axles 17. Detachable apron portions 22 may be mounted on each cover 21 in front of the corresponding wheel by bolts or other suitable means for ease of access to the wheels. A runner member 23 is mounted on each cover 21 by welding or other suitable means. An elliptical cam 24 is fixed on each axle 17 intermediate the ends in an aperture 25 in each supporting member. Cam retaining springs 26 and 27 are mounted on each supporting member in contact with the cams 24 to hold the axle against rotation.

The cam may have locking projections 28 and 29 on each side cooperating with locking openings 30 and 31 in the spring cam retaining means. The cam 24 may also have retaining flanges 32 on either side of the cam to retain the springs 26 and 27 on the cam 24.

In using this invention, the vehicle may be operated on dry ground by using the wheels and associated structure as shown in solid lines in each of the figures. When changing the structure for use on snow it is necessary merely to grasp the runners 23 or cover 21 and turn them and their associated axle 17 through 180 degrees against the resistance of the cam retaining means 26 and 27 to the position indicated in broken lines on Figures 1 and 4.

The simplicity of the structure of this invention is at once apparent and its utility will be quickly recognized. Its simplicity and ease of operation make it adaptable for use on vehicles designed for children as distinguished from the complex and cumbersome inventions heretofore proposed.

While there is illustrated and described a preferred embodiment of this invention, it will be understood that it may be otherwise embodied within the scope of the following claims.

I claim:

1. In combination, an axle adapted to be mounted for rotation on a vehicle body supporting member, a wheel rotatably mounted on each end of the axle, a cover fixedly mounted on the axle over each wheel, runner means on each cover, cam means fixed on the axle intermediate the ends thereof, and resilient cam retainer means adapted to be mounted on the vehicle body supporting member to hold the axle against rotation whereby with the cam in one position the cover is held substantially above the center line of the wheel with the wheel in contact with a surface over which the vehicle is to be moved and with the cam rotated 180 degrees from said one position the cover is held substantially below the center line of the wheel with the runner in contact with the surface over which the vehicle is to be moved.

2. The combination as claimed in claim 1 in which the cam means is an elliptical projection on the axle and the cam retainer means are a pair of flat spring members having a cam contacting curved portion for holding the cam in fixed position.

3. The combination as claimed in claim 1, in which the cover has a detachable apron portion.

JOHN HYDE.

REFERENCES CITED

The following references are of record in the file of this patent:

FOREIGN PATENTS

| Number | Country | Date |
| --- | --- | --- |
| 39,076 | Sweden | July 7, 1915 |